Jan. 13, 1959  W. S. STOKES  2,868,230
MEANS TO SUPPORT AND INSULATE PIPELINES
Filed Sept. 26, 1956  3 Sheets-Sheet 1
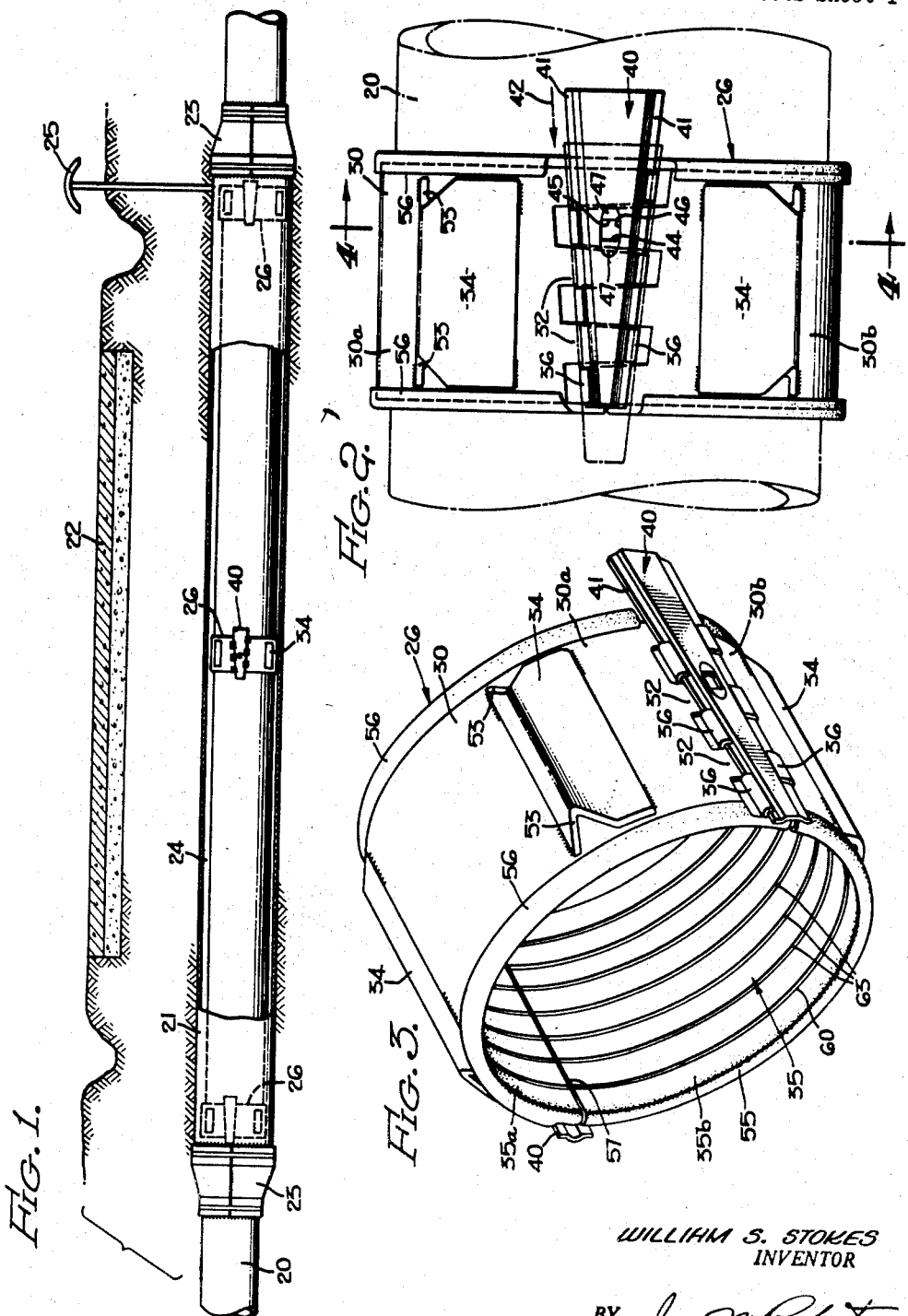
WILLIAM S. STOKES
INVENTOR
BY
ATTORNEY Jan. 13, 1959 W. S. STOKES 2,868,230
MEANS TO SUPPORT AND INSULATE PIPELINES
Filed Sept. 26, 1956 3 Sheets-Sheet 2
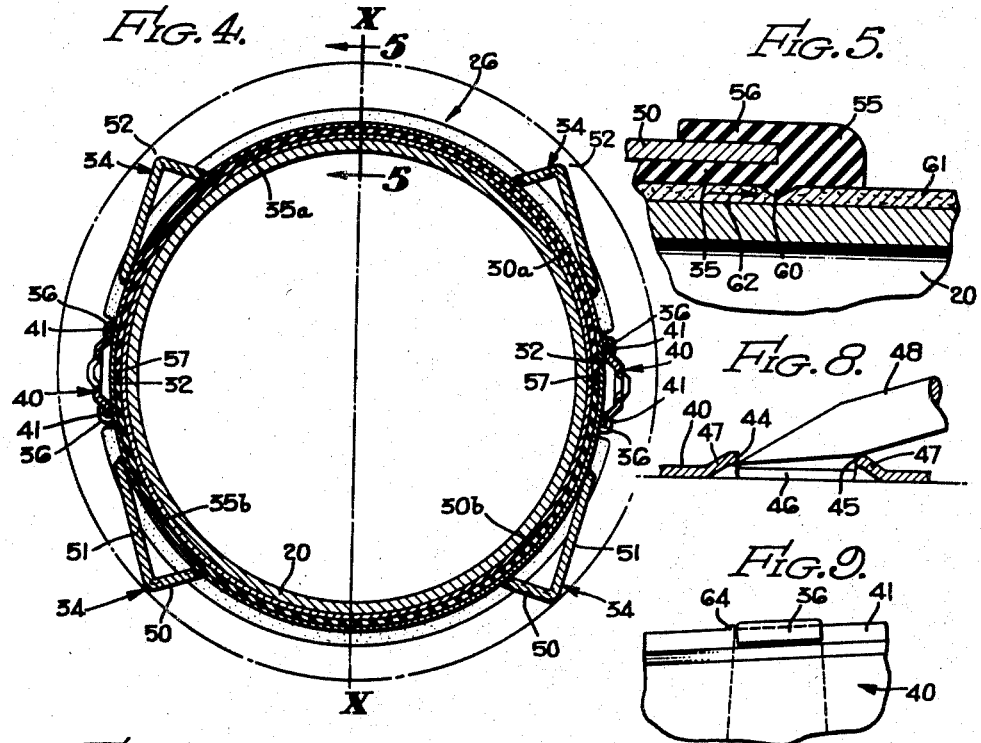
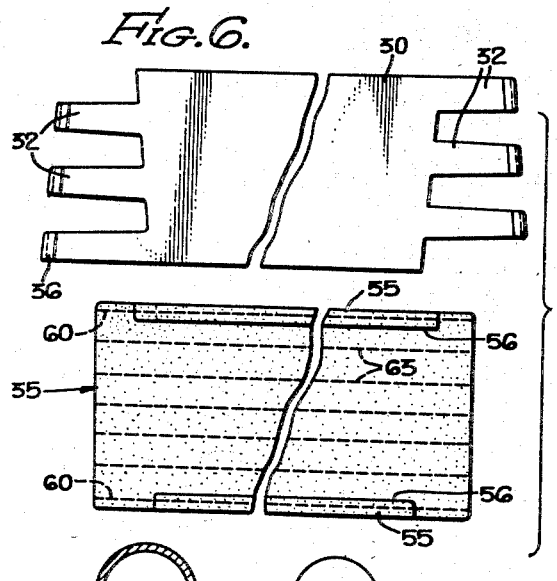
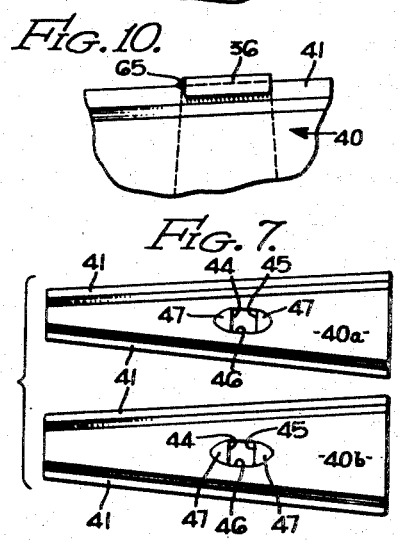
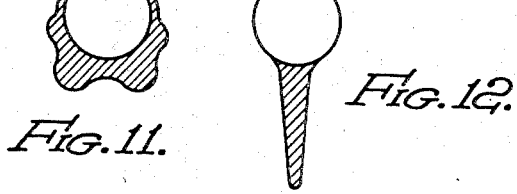
WILLIAM S. STOKES
INVENTOR
BY
ATTORNEY Jan. 13, 1959  W. S. STOKES  2,868,230
MEANS TO SUPPORT AND INSULATE PIPELINES
Filed Sept. 26, 1956
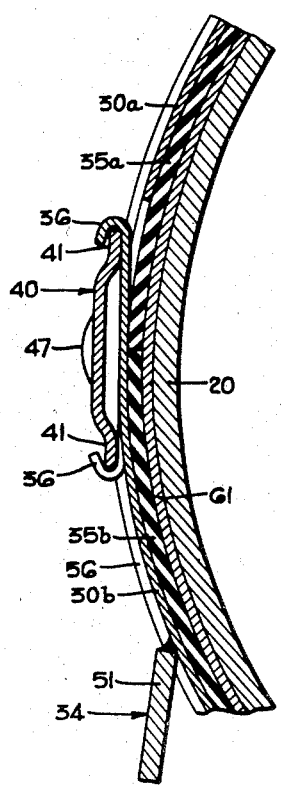
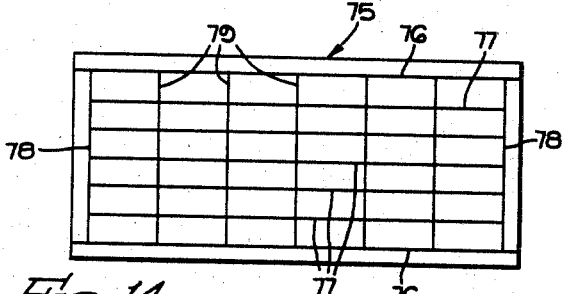
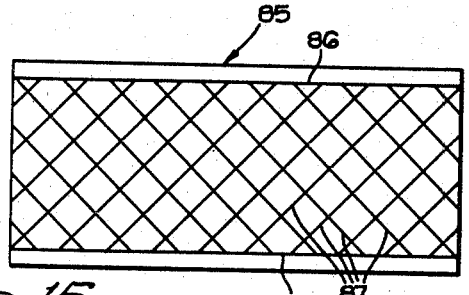
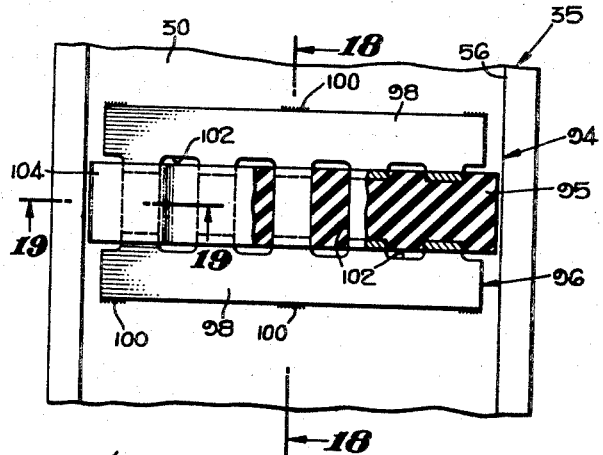
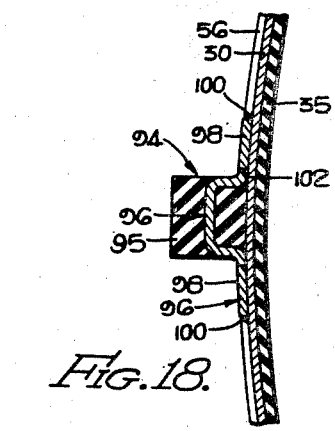
WILLIAM S. STOKES
INVENTOR
BY *Jack M Roberts*
ATTORNEY

United States Patent Office 2,868,230
Patented Jan. 13, 1959

2,868,230

MEANS TO SUPPORT AND INSULATE PIPELINES

William S. Stokes, Tarzana, Calif., assignor to Pipeline Coating & Engineering Co., Incorporated, Los Angeles, Calif., a corporation of California Application September 26, 1956, Serial No. 612,327

13 Claims. (Cl. 138—65)

This is a continuation-in-part application based on my copending application Serial No. 354,264, filed May 11, 1953, entitled "Method and Apparatus For Laying a Pipe Line Under Railway Right of Way" now Patent No. 2,816,575.

This invention relates to transmission pipelines for long-distance transportation of fluids, such as oil and gas, and is directed specifically to the construction of a pipeline insulating spacer for electrically insulating a carrier line from a surrounding casing, for example, a short run of surrounding casing where the pipeline passes under a highway. Such an insulating spacer typically comprises a band means to encircle the pipe and spacer means, commonly in the form of a plurality of skids, to support the band means in spaced relation to the inner surface of the surrounding casing.

The casing under the highway surrounds the pipeline approximately concentrically and is sealed at its opposite ends to provide an annular space around the pipeline to receive any gases or vapors that may leak or form under the highway. A vent pipe from this sealed annular space extends above ground to one side of the highway to bleed off such gases or vapors. Thus, the arrangement prevents any hazardous accumulation of explosive fluids immediately under the highway.

Insulating spacers must be provided to support the pipeline approximately concentrically in the casing and to electrically insulate the pipeline from the casing. A troublesome problem arises, however, because the pipeline is customarily covered for anticorrosion purposes with coal tar or asphalt or other suitable material forming an outer coating of a thickness ranging in practice from $3/32$ inch to $1/2$ inch, and the full weight of the pipeline must be transmitted to the casing through this relatively soft and flowable coating. The pipeline is necessarily heavy, especially when it is used to transport a liquid, and the problem is to arrange for the pipeline coating to take this weight without the protective effectiveness of the coating being destroyed by cold flow. Any concentration of pressure on the pipeline coating will cause cold flow away from the pressure area.

A second troublesome problem arises because, customarily, the casing is first laid under the highway, then a section of the coated pipeline is pushed through from one end until both ends of the pipeline section project beyond the ends of the casing, and then the pipeline section is tied into the remainder of the line by welding. It is necessary that the coating on the section of the pipeline that is to lie within the casing be protected from abrasion, rupture or stripping of the protective coating during the operation of pushing the pipeline section through the casing. One object of the present invention is to provide an insulating spacer that will permit such a pipeline to be installed in a casing without danger of damage to the coating, that will electrically insulate the pipeline from the casing, and that will support the pipeline approximately concentrically in a casing without appreciable damage to the pipeline coating and without cutting off free fluid communication in the casing between the opposite sides of the spacer.

The invention is based on certain discoveries relative to the prevention of cold flow of a relatively soft coating material such as asphalt on a large diameter pipe where an insulating spacer supporting the pipe is in contact with the coating with consequent pressure against the coating.

One discovery is that where the insulating spacer has an inner support surface that conforms to the cylindrically curved surface of the coating in extensive surface-to-surface contact therewith so that cold flow can occur only along the inner support surface, such flow away from an area of relatively high unit pressure to an immediately adjacent area of substantially less pressure can be prevented by the provision of a relatively thin linear barrier. Such a barrier may be in the form of a thin rib extending inwardly from the inner support surface, the rib being of less depth than the thickness of the coating for only partial penetration of the coating. With the ribs extending inwardly from an inner support surface and with the ribs preventing cold flow across the lines defined by the ribs, the inner support surface from which the ribs project limits the penetration of the ribs into the coating material. If the coating has the general physical characteristics of asphalt and is of a thickness of $3/32$ inch or more, a rib penetrating the coating to a depth of $1/32$ inch to $1/16$ inch prevents cold flow in the face of a pressure differential on the opposite sides of the rib of 40 to 50 p. s. i. With such ribs to prevent cold flow at the side edges of an insulating spacer when the coating at the inner surface of the insulating spacer is subjected to a pressure of 40 to 50 p. s. i., the insulating spacer need be of only moderate width to support the weight of a relatively heavy pipe without impairing the pipe coating.

A second discovery is that, within liberal limits, cold flow will not occur along such a contacting inner support surface from one contact area of relatively high unit pressure to another contact area of lesser unit pressure if there is no severely abrupt pressure drop between the two areas, such as the abrupt pressure drop that occurs at the side edge of an insulating spacer on the underside of a coated pipe. Thus, if the band means of a supporting insulating spacer extends up the circumference of the coated pipe from a bottom contact region of maximum unit pressure to an upper contact region of substantially less unit pressure, and the band means is under substantially circumferential tension, no inner rib is needed between the two areas to prevent circumferential cold flow. In fact, the band means may have a substantial gap in the upper region of the coated surface of the pipe without cold flow into the gap. Accordingly, a band means may be of split or sectionalized construction with one band section extending over approximately the lower 180° of the circumference of the pipe, the other band section extending over approximately 180° on the upper side of the pipe. To prevent damage to the pipe coating by cold flow, it is necessary to provide only the circumferential edges of the band sections with ribs or flanges to function in the manner described, no ribs being necessary to prevent cold flow into the two gaps between the band sections that are located approximately 90° from the lowest point of the pipe circumference.

These discoveries are based on the surprising effectiveness of the coefficient of internal friction of coating material of the character described under the described conditions.

All materials of the character here under consideration will cold flow of their own weight if a sufficient mass is involved and no restriction is imposed upon material movement. The amount and rate of movement is dependent, in the absence of external forces or restrictions, upon the mass and the coefficient of internal friction of the material. A state of equilibrium to result in cessation of flow will obtain when the force per unit area, represented by the weight of the material, is exactly balanced by the resistive force generated by the coefficient of internal friction. Consequently, an externally imposed force can be exactly balanced by an external restriction, which, depending upon the magnitude of the force involved, need not completely enclose the material. The restriction imposed on the commonly used pipeline coating material, such as asphalt, coal tar, and so forth, by the penetration of a relatively shallow and narrow rib, is sufficiently great to balance the force represented by a considerable unit surface load, thereby producing a state of equilibrium within the coating and a stable surface on which the pipeline and its contents may rest. In this way, the invention limits the deformation of the pipeline coating to the relatively shallow penetration of the inner ribs. It will be apparent to those skilled in the art that this underlying concept may be carried out in various ways in various practices of the invention.

The preferred practice of the invention is further characterized by the addition of a multiple-function rubber-like liner inside the circumferential metal band means. One important purpose of the liner is to provide coating-penetrating ribs to prevent cold flow in the manner mentioned above. A second important purpose of the liner is to serve as a resilient semifluid medium for distributing pressure circumferentially of the coated pipeline. A third purpose for the liner is to serve as an insulating sleeve for electrical isolation of the band and skids from the pipeline. A fourth purpose is to provide penetrating ribs to anchor the spacer to the pipeline coating and to prevent longitudinal movement of the insulating spacer relative to the coated pipeline during installation of the pipeline in the casing. A fifth purpose is to make it unnecessary to shape the circumferential band for close, accurate conformance to the surface configuration of the pipeline. A sixth purpose of the rubber-like liner is to cooperate with other elements to make the insulating spacer adjustable through a range of diameters of coated pipe. A seventh purpose of the rubber-like liner is to reduce to a minimum the number of skids required on the circumferential band. A special advantage of using such a liner to provide ribs for the prevention of cold flow is that the liner may be of extruded construction to provide smooth, uniform ribs in an inexpensive manner.

A feature of the preferred practice of the invention is that it may be utilized as an insulating spacer for a run of bare pipe as distinguished from coated pipe. When the insulating spacer is mounted on a bare pipe, an important purpose of the rubber-like liner is to cause the insulating spacer to engage the pipe in a manner effective to prevent slippage of the liner along the bare metal surface. When the invention is employed in this manner, the ribs of the nonconducting liner serve as frictional or antislippage means to prevent displacement of the insulating spacer longitudinally of the pipe even when the insulating spacer serves as a sliding support for the pipe. Thus, the invention makes it possible to install a series of spacers on a run of bare pipe and then to move the spacer-equipped pipe endwise into the casing with the spacers fixed relative to each other and sliding along the casing.

The various objects, features and advantages of the invention will be apparent from the following detailed description of a selected embodiment of the invention considered with the accompanying drawings.

In the drawings, which are to be regarded as merely illustrative:

Fig. 1 is a view partly in side elevation and partly in section, showing how the invention is employed to support a pipeline in a casing under a highway;

Fig. 2 is an enlarged side elevation of a selected embodiment of the invention;

Fig. 3 is a perspective view of the embodiment;

Fig. 4 is a transverse section taken as indicated by the line 4—4 of Fig. 2;

Fig. 5 is a greatly enlarged fragmentary section taken as indicated by the line 5—5 of Fig. 4;

Fig. 6 is a plan view of a band member and of a corresponding liner member employed in this practice of the invention;

Fig. 7 is a plan view of two wedges of different widths that are employed selectively for tightening the circumferential band;

Fig. 8 is a fragmentary sectional view, showing how a cold chisel may be used to receive hammer blows for driving a wedge;

Fig. 9 is a fragmentary plan view, showing how an edge of a wedge may be peened to prevent retraction of the wedge;

Fig. 10 is a similar view, showing how the edge of the wedge may be welded to an associated portion of the band to prevent retraction of the wedge;

Figs. 11 and 12 are diagrams showing patterns of pressure distribution achieved by different arrangements of a skid-equipped circumferential band;

Fig. 13 is an enlarged portion of the sectional view in Fig. 4;

Fig. 14 is a plan view of a second form of liner member that may be employed, the liner member being shown with its inner face uppermost;

Fig. 15 is a similar view of a third form of liner member that may be employed;

Fig. 16 is a sectional view, showing how any one of the three forms of liner may be formed with ends tapering in thickness so that the adjoining ends of the liner surrounding the pipe may overlap to form an effective continuous liner structure;

Fig. 17 is a plan view of a second form of skid that may be substituted for the first described form on the circumferential band;

Fig. 18 is a section taken as indicated by the line 18—18 of Fig. 17; and

Fig. 19 is a fragmentary section taken as indicated by the line 19—19 of Fig. 17.

Fig. 1 illustrates how a pipeline 20 for transporting oil, gas and the like, is surrounded by a casing 21 where the pipeline passes under a roadbed 22. The casing 21 is sealed at its opposite ends by annular means 23 to provide a sealed annular space 24 around the length of the pipe line that extends immediately under the roadbed 22. A suitable vent pipe 25 places this sealed annular space 24 in communication with the atmosphere to one side of the roadbed 22 for release and dissipation of any vapor or gas that may exist in the annular space 24. The pipeline 20 is supported in the casing 21 by means of a plurality of longitudinally spaced insulating spacers, each generally designated by numeral 26.

As best shown in Fig. 3, the principal parts of an insulating spacer 26 comprise an adjustably contractible band 30 that is split transversely to provide at least one pair of mating ends having intermeshing fingers 32, a series of circumferentially spaced skids 34 mounted on the outer surface of the band, and a liner 35 of rubber-like material inside the band.

In the construction shown, the band 30 is made in two sections 30a and 30b, the ends of which are formed with two sets of intermeshing fingers 32. Such a band may be made of cold rolled steel to embrace pipes ranging from 1½ to 36 or more inches in diameter and should be at least 18 gauge (.047") thickness for pipe under 6 inches in diameter; 14 gauge (.083") thickness for pipe between 6 and 10 inches in diameter; and 12 gauge (.109") thickness for pipe 12 inches or over in diameter to prevent undue local distortion by stresses transmitted thereto by the skids 24. As will be explained, the intermeshing fingers are adapted for cooperation with suitable wedges to draw the band tight, but other band-tightening expedients may be employed in some practices of the invention within the scope of the appended claims.

As may be understood by reference to Fig. 6, the series of fingers 32 at the two ends of the band are complementary in shape so that a suitable die in a punch press may be used to sever a piece of band stock and thereby form two sets of intermeshing fingers 32 in one press stroke with no loss of material. As best shown in Fig. 2, the two sets of fingers 32 at a pair of mating ends of the band 30 intermesh and overlap circumferentially. The ends of the various fingers are bent to form hooks 36 and these hooks of the two sets of fingers are aligned to form a tapered wedge channel to receive a wedge 40.

With the band 30 made in two sections, two wedges 40 are required to interconnect the mating ends of the band sections and these two wedges may be at diametrically opposite positions. Preferably, as best shown in Fig. 3, each of the wedges 40 is of arched cross-sectional configuration with two opposite longitudinal side flanges 41. The inner surfaces of the finger hooks 36 serve as shoulders for wedging engagement with the edges of the side flanges 41 so that driving a wedge 40 in the direction indicated by the arrow 42 in Fig. 2 results in progressive tightening of the circumferential band. If the wedge is driven by hammer blows, the tightening of a band progresses incrementally.

It is to be noted that when a wedge 40 is in its position of minimum contraction of the band, with the smaller end of the wedge substantially even with the far side of the band, as shown in full lines in Fig. 2, the two sets of fingers 32 associated with the wedge are positioned for maximum circumferential dimension of the band. On the other hand, if the wedge is driven further into the wedge channel to place the larger end of the wedge approximately at the inner edge of the band 30, as shown in broken lines in Fig. 2, the two sets of fingers 32 forming the wedge channel are drawn together for minimum circumferential dimensioning of the band. Thus, each wedge 40 affords a certain range of incremental contraction of the band 30.

Each of the spacer clamps includes two wedges 40a and 40b (Fig. 7) for use interchangeably in each wedge channel, the wedge 40b being slightly wider than the wedge 40a. For example, the difference in width may be ⅜ inch. Thus, the circumferential dimensioning of the installed band 30 may be varied, not only by the degree to which the different wedges are driven into the corresponding wedge channels, but also by using the wedges 40a and 40b selectively.

Each of the wedges 40 is provided with a shoulder 44 to receive the force of hammer blows for driving the wedge in the band-tightening direction, and, preferably, each wedge is also provided with a second shoulder 45 to receive the impact of hammer blows in the opposite direction for loosening the wedge in its channel. The shoulders 44 and 45 may be provided by cutting an aperture 46 in each wedge member 40 and offsetting the opposite edges of the aperture to form upwardly inclined lips 47.

Fig. 8 illustrates how a chisel 48, for example, may rest on one of the lips 47 with the leading edge of the chisel abutting one of the shoulders 44 or 45 so that a hammer blow may be delivered to the blunt end of the chisel for driving the wedge 40 longitudinally. An important advantage of this method of moving a wedge 40 longitudinally is that the chisel rests in a position to preclude accidental damage to the spacer structure or the pipeline coating and the hammer blow is delivered to the chisel at a substantial distance from the spacer and the pipeline coating.

In the construction shown in the drawings, each of the skids 34 is an angular member that has each of its legs welded to the band 30. Such angular skids may be formed of sheet metal or may be standard structural angles. It is contemplated that only one size of angle will be carried in stock for fabricating the bands 30 and that one leg of each stock angle will be trimmed as desired to set the height of the apex of the finished skid to allow the spacer assembly to support the pipeline approximately concentrically in the casing. The same purpose may be accomplished by varying the included angles between the two legs of each skid.

It is contemplated that there will be at least two skids 34 on each band section 30a and 30b and that these two skids will be positioned on opposite sides of the vertical axial plane of the installed spacer clamp, the radial positions of the two skids being preferably at 45° from that plane. See Fig. 4 in which the two lowermost skids 34 are at approximately 45° from this vertical plane represented by the line X—X. In the present embodiment of the invention, there are four skids 34, as best shown in Fig. 4, there being one skid at each end of each band section 30a and 30b.

In the preferred practice of the invention, the two half sections of the spacer assembly 26 are identical and interchangeable for ease in installation. The height of the skids 34 is set to allow the insulating spacer 26 to support the pipeline 20 slightly below the center of casing 21 to allow a clearance 52 (Fig. 4) between the apex of each of the upper skids 34 and the inside wall of the casing 21 to assure elimination of any possibility of the insulating spacer 26 jamming in the casing 21 during the installation of pipeline 20 into the casing because of an out-of-round, or other unusual condition.

Each angular skid 34 has one leg 50 that is much shorter than the other leg 51, and in the two lowermost skids the longer legs 51 extend upward. It is apparent in Fig. 4 that the upward thrust reaction of each of the lowermost skids 34 in carrying the weight of the enclosed pipeline is in a direction that extends between the two legs of the skid so that the reaction tends to spread the two legs apart, there being no tendency for the reaction force to twist or rotate the skid relative to the band 30. It will also be apparent in Fig. 4 that the upwardly extending longer leg 51 of each of the two lowermost skids 34 transmits this reaction force to the band 30 tangentially thereof, the upward tangential force applied by a skid 34 on one side of the vertical axial plane being opposed and balanced by the tangential force applied to the band by the skid on the other side of the plane.

Each of the skids 34 is cut away or tapered at each end to form an inclined shoulder 53, as shown in Figs. 2 and 3. When a series of insulating spacers is mounted on a pipe and the pipe is then slid endwise into the casing to the desired final position, the lowermost skids 34 of the various insulating spacers support the pipe and slide along the inner surface of the casing. During such sliding movement, the inclined shoulders 53 of the weight-supporting skids serve as ramps to cause the skids to ride over minor obstructions on the inner surface of the casing.

The liner 35 is preferably made in two identical sections 35a and 35b corresponding to the band sections 30a and 30b. These liner sections are preferably made of a suitable rubber-like material. It has been found that a suitable material for the liner sections is neoprene, of a suitable Shore hardness, such a material being immune to most of the substances that ordinarily cause elastomers to deteriorate. Preferably, the liners are fabricated by extrusion.

As best shown in Fig. 5, each of the liner sections 35a and 35b has thickened edge portions 55 on its two opposite sides, and each of the thickened edge portions is formed with a longtiudinal lip 56 that lies against the outer marginal portion of the band 30. By virtue of this construction, each of the liner sections 35a and 35b may be quickly mounted on the corresponding band section 30a or 30b and mechanically engaged therewith by the two longitudinal lips 56 of the liner section.

In some instances, the two liner sections 35a and 35b may be of sufficient length that their mating ends will abut firmly, as indicated by the lines 57 in Fig. 4, when the surrounding band 30 is at maximum circumferential dimension provided by the wedges 40. Thus, the mating ends of the two liner sections 35a and 35b meet at the maximum diameter adjustment of the band 30, and, of course, meet at all of the lesser circumferential dimensions to which the band 30 may be adjusted, the band compressing the material of the liner sections to make the liner sections conform to the smaller circumferential dimensions within the scope of adjustment of the band. A feature of the invention, however, is that there may be substantial gaps between the ends of the two liner sections, each gap being well above 90° from the lowermost point of the pipe circumference.

Each of the liner sections 35a and 35b will be formed with at least two radial inward directed ribs 60, the ribs being positioned, respectively, in the regions of the side edges of the band 30, as may be seen in Fig. 5. Fig. 5 shows how these ribs penetrate the pipeline coating 61 to a depth to block the tendency of the coating to escape from the pressure area by cold flow. This tendency for cold flow is indicated by the arrow 62 in Fig. 5. The ribs 60 need not be of greater radial dimension than on the order of magnitude of $\frac{1}{32}$ inch or $\frac{1}{16}$ inch, a dimension appreciably less than the thickness of even a relatively thin coating. Preferably, the ribs 60 are of generally triangular cross-sectional configuration, as shown, with a radial dimension of $\frac{1}{32}$ inch. If desired, the inner surface of each of the liners 35a and 35b may also be provided with a series of intermediate spaced ribs 63 which divide the liner sections into successive circumferential zones.

The manner in which the invention serves its purpose may be understood from the foregoing description. It is apparent that the liner sections 35a and 35b may be quickly mounted on the corresponding band sections 30a and 30b in mechanical engagement therewith. The two band sections are interconnected by placing one of the wedges 40 in one of the wedge channels, preferably, with the wedge in a retracted position, as shown in full lines in Fig. 2, so that the wedge may be subsequently driven further into the channel for contracting effect on the band. The band assembly is then placed around the pipe 20 and the second wedge is placed in the second wedge channel to interconnect the other ends of the two band sections. The two wedges 40 are then driven deeper into the corresponding wedge channel by using a chisel in the manner illustrated by Fig. 8. The two wedges are driven in their channels until the band 30 is placed under the desired circumferential tension.

At the desired magnitude of circumferential tension, the band places the liner under radial compression throughout the whole circumferential extent of the liner. With the two lowermost skids 34 at radial positions 45° from the vertical, as shown in Fig. 4, and with the wedges tightened to the desired degree to place the band 30 under adequate tension, the pattern of the pressure imposed on the pipeline coating around the circumference of the liner is of the character illustrated by the graph in Fig. 11.

In Fig. 11, the cross-hatched area represents the magnitude of pressure per unit area exerted by the liner 35 against the pipeline coating at different points around the circumference of the pipeline. It will be noted that there is a substantially uniform minimum pressure per unit area around the upper 180° of the pipe circumference. Around the lower 180° of the circumference of the pipe, the pressure is of higher magnitude because of the downward thrust imposed by the weight of the pipeline, but there is a surprising approach to uniformity inasmuch as the maximum pressure in any downward radial direction is no greater than approximately twice the minimum radial pressure over the range of the pipe circumference. This desirable pressure pattern that is free of excessive pressure peaks is made possible in large part by adequate circumferential tensioning of the metal band against the resilient liner, and is further made possible by the positioning of the two lowermost skids 34 to straddle the vertical axial plane of the pipeline.

If one of the skids 34 is positioned centrally under the center of gravity of the pipeline, or if two or three skids are positioned relatively close together in such a central position, and if the metal band is not placed under adequate circumferential tension, the pattern of the pressure per unit area against the pipeline coating around the circumference of the pipeline will be of the character shown by the diagram in Fig. 12. In Fig. 12, all of the pressure against the coating 61 is concentrated in a narrow zone at the bottom of the pipeline, the pressure pattern, in effect, comprising a single excessive peak. Such a pressure peak would, of course, greatly exceed the permissible tolerance of pressure per unit area against the pipeline coating.

It is to be noted that the addition of the intermediate ribs 63 divides the circumferential pressure area of the pipeline coating 61 into a series of circumferential zones, each of which is completely bounded by a pair of the ribs. The pressure per unit area in these inner zones may greatly exceed the pressure in the two marginal zones so long as the pressure differential between successive zones does not exceed the tolerance for the given coating, for example, a tolerance of 40–50 p. s. i.

Referring again to Fig. 11, it will be noted that there are two regions of maximum pressure on the underside of the pipe, two regions of intermediate pressure just under half-way up the opposite sides of the pipe, and a region of minimum pressure extending over approximately the upper 180° of the circumference of the pipe. The ribs 60 and 63 of the lower liner section 35b effectively prevent cold flow of the coating out from under the liner in directions longitudinally of the pipe and the fact that the two ends of the lower liner section extend to or nearly to the upper region of minimum pressure, prevent circumferential cold flow of the coating even if there are substantial gaps between the ends of the two liner sections 35a and 35b. Thus, even if the lower section terminates in the two side regions of intermediate pressure, cold flow can occur only along circumferential paths of substantial length to the two gaps and the coefficient of internal friction of the coating material effectively prevents such circumferential cold flow in accord with the previously mentioned second discovery.

One way of securing a wedge against loosening is to use a cold chisel to peen or deform an edge or side flange 41 of the wedge adjacent one or more of the finger hooks 36. Thus, Fig. 9 shows at 64 how the edge of the wedge 40 may be deformed by a chisel to form a small shoulder 65 in abutment with a finger hook 36 to prevent loosening, longitudinal movement of the wedge. Fig. 10 shows how the wedge may be secured by welding 65, if desired, the welding permanently securing the wedge to the edge of the finger hook 36.

Fig. 14 shows a second form of liner 75 that may be substituted for the liner 35 in the described insulating spacer assembly. The liner 75 may be made of a suitable plastic material, for example, a polyester resin or the like, reinforced by embedded glass fibers. The liner 75 is in the form of a sheet which is molded to provide a series of intersecting ribs on its inner surface. Preferably, the liner has a series of spaced longitudinal ribs, there being at least two longitudinal ribs 76 adjacent the two longitudinal margins, respectively, of the liner. In this instance, there are a number of additional intermediate longitudinal ribs 77. The liner 75 also has at least two transverse ribs 78 adjacent the two end margins respectively of the liner, these ribs meeting the longitudinal ribs. In this instance, the liner has additional intermediate transverse ribs 79. The various ribs 76–79 may be of the same dimension and configuration as the ribs 63 in the first described form of the invention. The liner 75 may be permanently bonded to a band section 30a or 30b in any suitable manner, for example, by plastic adhesive material.

An important feature of the liner 75 is that it provides a system of ribs to completely enclose or bound at least one area of a surface of the pipe to which the liner is applied. It is apparent that the described liner 75 provides a system of ribs that completely bounds several areas of the coating of the pipe to which the liner is applied. Thus, this form of the invention provides positive barriers against cold flow in all directions.

Fig. 15 shows a third form of liner 85, which may be a molded product of the same material as liner 75. The liner 85 has two longitudinal marginal ribs 86 and a series of intersecting diagonal transverse ribs 87. It is apparent that the liner 85 functions in the same manner as the liner 75 with respect to preventing cold flow of the pipe coating in all directions.

Fig. 16 shows how any one of the three liners shown in Figs. 6, 14 and 15 may be formed with ends 90 that taper in thickness so that adjacent ends 90 may overlap to form an effective continuous liner structure around a pipe. If the previously described liners 35a and 35b overlap in this manner, the taper and thickness may be extended to the longitudinal ribs 60 and 65 so that the ends of the ribs overlap.

Figs. 17 and 18 show how a skid, generally designated 94, may be substituted for each of the skids 34 on a band section 30a or 30b, if desired. The skid 94 comprises a molded body 95 of hard rubber or other suitable plastic material anchored by a skid bracket 96. The skid bracket 96, which may be made of heavy sheet metal, is U-shaped in cross-sectional configuration and is formed with longitudinal flanges 98, the flanges 98 being welded to the band 30 as indicated at 100. The central raised portion of the skid bracket 96 has a series of spaced longitudinal slots 102 therein. The body 95, which may anchor suitable reinforcement material, is molded with the central portion of the skid bracket 96 embedded therein.

Preferably, the body 95 is tapered to form an inclined shoulder 104 at each end, as best shown in Fig. 19. The inclined shoulders 104 serve the same purpose as the previously described inclined shoulders 53 of the skids 34. An important advantage is that the skid body 95 is made of nonconducting material so that the skid of the spacer assembly, as well as the liner structure of the assembly, serves the purpose of electrically insulating the pipe from the surrounding casing.

My description in specific detail of the selected forms of the invention, by way of example, and to illustrate the principles involved, will suggest various changes, substitutions and other departures from my disclosure that properly lie within the spirit and scope of the appended claims.

I claim as my invention:

1. In a band-type spacer for use in a cylindrical casing to embrace and support a pipeline having a coating of a given thickness of a relatively soft material capable of cold flow, said spacer having an inner support surface conforming generally to the cylindrical configuration of the coating for face-to-face pressure contact with the coating, and said surface having circumferentially extending ribs projecting inwardly therefrom of less radial dimension than the thickness of the coating for partial penetration of the coating to serve as barriers to prevent cold flow of the coating material in an axial direction out of the area of pressure contact without completely penetrating the coating to destroy the continuity thereof.

2. In an insulating spacer for use in a cylindrical casing to support therein a pipeline having a coating of a given thickness of a relatively soft material capable of cold flow, the combination of: band means to embrace the pipeline under circumferential tension; and spacer means mounted on said band means for supporting contact with said casing, said band means having at least two inner ribs to penetrate said coating and having an inner circumferential support surface to press against the coating to limit the penetration of said ribs into the coating, the radial dimension of said ribs measured inwardly from said inner circumferential support surface being less than said given thickness, said ribs being on opposite sides of an area extending in a circumferential direction and said inner circumferential support surface spanning said area whereby the coating material is restricted with respect to cold flow between the ribs, and whereby the weight of the pipeline is transmitted to said inner circumferential support surface within said area by the pipeline coating.

3. A spacer as set forth in claim 2, in which there are more than two of said ribs extending in circumferential directions to divide said inner circumferential surface into a plurality of pressure zones.

4. A spacer as set forth in claim 2, which includes two ribs extending in circumferential directions adjacent the two circumferential side edges respectively of said band means.

5. In an insulating spacer for use in a cylindrical casing to support therein a pipeline having a coating of a given thickness of a relatively soft material capable of cold flow at moderate temperatures and pressures, the combination of: band means to embrace the pipeline under tension; and spacer means mounted on said band means for contact with the inner surface of said casing to support the band means in spaced relation to the inner surface of the casing, said band means having an inner support surface conforming to the curvature of said coating in surface-to-surface contact with the coating for transmitting supporting pressure to the coating, said band means having ribs extending inwardly from said inner support surface, the radial dimension of said ribs measured inwardly from the inner support surface being less than the thickness of said coating for partial penetration of the coating to prevent cold flow of the coating.

6. A combination as set forth in claim 5, in which said band means comprises a plurality of sections including one lower section extending over at least approximately the lower half of the circumference of said coating, said inner ribs being on said lower section.

7. A combination as set forth in claim 6, in which there are gaps at the two ends of said lower section and in which said lower section has ribs extending in circumferential directions and terminating at said gaps.

8. A combination as set forth in claim 5, in which said ribs completely enclose areas of the coating surface.

9. A combination as set forth in claim 5, in which said ribs extend in different directions and intersect to completely enclose areas of the coating surface.

10. In an insulating spacer for use in a cylindrical casing to support therein a pipeline having a coating of a given thickness of a material capable of cold flow at moderate temperatures and pressures, the combination of: metal band means to embrace the pipeline under tension; spacer means mounted on said band means for supporting contact with the inner surface of said casing; and a liner of resilient nonconducting material for said metal band means providing an inner support surface for supporting surface-to-surface pressure contact with said coating, said liner being formed with ribs projecting inwardly from said inner support surface and extending in a circumferential direction only, the radial dimension of said ribs measured inwardly from the inner support surface being less than the thickness of said coating for partial penetration of the coating to prevent cold flow of the coating.

11. A combination as set forth in claim 10, in which said liner is made of rubber-like material and extends around the circumferential edge of the band means with marginal portions of the liner overlapping outer marginal portions of the band means.

12. An electrically insulating apparatus for supporting a pipeline spaced from the inside of an outer casing and facilitating skidding the pipeline into the casing, which comprises, in combination: a discontinuous detachable band of a length adapted to extend substantially around the circumference of said pipeline with opposite ends of the band adjacent one another and the band having inside and outside faces; flexible electrically insulating material disposed on the inside face of said band to electrically insulate the band from the pipeline on which it is to be disposed, said insulating material being a rubber-like material and being formed with a plurality of inner ribs for contact with the surface of the pipeline; a plurality of elongate spacers having one of their sides attached to the outside face of said band, said spacers being disposed substantially parallel to each other and in circumferentially spaced relation about the pipeline on which the apparatus is to be assembled, said band being of a width at least substantially equal to the length of said spacers and providing a bearing support for the spacers between the spacers and the pipeline to distribute the bearing load of the spacers over a larger area than that of said sides; and means for tightly clamping said band and spacers about the pipeline.

13. An apparatus as set forth in claim 12, in which said rubber-like insulating material envelops opposite circumferentially extending edges of said band to protect the surface of the pipeline from said edges when the pipeline is skidded into position inside said casing.

References Cited in the file of this patent

UNITED STATES PATENTS

| | | |
|---|---|---|
| 809,327 | Rieske | Jan. 9, 1906 |
| 1,122,130 | Lamson | Dec. 22, 1914 |
| 2,504,881 | Russell | Apr. 18, 1950 |
| 2,616,736 | Smith | Nov. 4, 1952 |
| 2,690,193 | Smith | Sept. 28, 1954 |
| 2,706,496 | Bond | Apr. 19, 1955 |
| 2,750,963 | Bond | June 19, 1956 |
| 2,765,000 | Bond | Oct. 2, 1956 |